J. KARITZKY.
CONDUIT OR CABLE CLAMP AND BRIDLE RING.
APPLICATION FILED AUG. 17, 1920.
1,381,198.
Patented June 14, 1921.
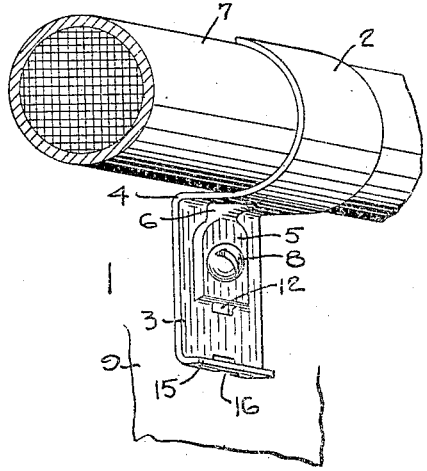
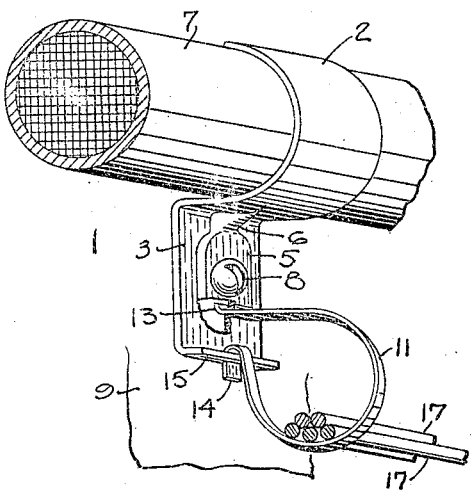
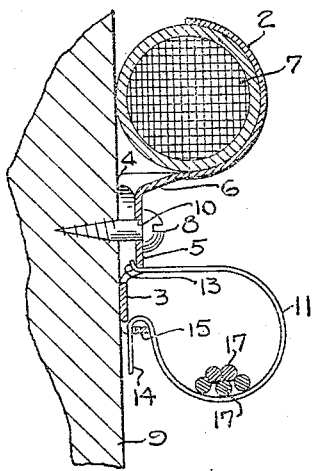
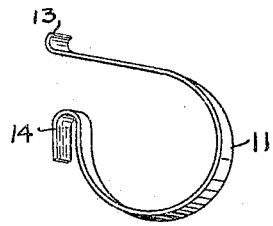
INVENTOR
John Karitzky
BY
Alark Johnson
ATTORNEY

UNITED STATES PATENT OFFICE.

JOHN KARITZKY, OF GARWOOD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,198.  Specification of Letters Patent.  Patented June 14, 1921.

Application filed August 17, 1920. Serial No. 404,161.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a strong cable clamp which can be made of metal of the minimum thickness and weight. My invention further relates to providing the base of the clamp with a raised boss alone, but preferably in conjunction with a strengthening shoulder extending from the boss to the hook portion, and serving to transmit a large part of the strains directly to the securing screw through the boss.

My invention further relates to such a conduit or cable clamp provided with means to secure the two ends of a bridle ring should it be desirable later to add such a bridle ring. My invention further relates to a conduit or cable clamp formed from sheet metal and having the boss, and also the strengthening shoulder if that be used, struck up from the base.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a perspective view of the conduit or cable clamp shown in Fig. 1 with the addition of a bridle ring formed from flat sheet metal;

Fig. 3 is a vertical section through the conduit or cable clamp shown in Fig. 2;

Fig. 4 is a perspective view of the preferred form of my spring bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal.

The meeting surface 4, between the base 3 and the hook portion 2, is the weakest portion of the clamp. By my invention I provide the base 3 with a struck up portion 5 raised above the surface of the base 3. Preferably, this boss is extended to form a strengthening struck up shoulder 6, extending from the boss to the under surface of the hook portion 2 and merging into the hook 2.

A large portion of the strains thrown upon the clamp 7 will be taken by the strengthening shoulder 6 and transmitted directly to the raised boss 5 and by it to the securing screw 8, holding the clamp 1 to the wall or other suitable support 9. This boss 5 is provided with an aperture 10 to permit the screw 8 to pass through it.

My conduit or cable clamp, so far described, may be used alone, as shown in Fig. 1, or in combination with a bridle ring such as shown in Fig. 4. It is therefore preferably provided with means to hold and secure the bridle ring 11. These securing means may be variously formed. I have shown by way of illustration the boss 5 provided with an opening 12 within which fits the hook 13 of the bridle ring 11. The base may be provided with any suitable coöperating means to secure the other hook 14 of the bridle ring 11. Preferably I have shown the base 3 provided with a flange 15, having an opening 16, within which the hook 14 is mounted.

The conduit or cable clamp 1 will usually at first be used alone. Whenever the traffic load becomes excessive, and it is desired to increase the capacity by stringing runs of bridle wires 17, 17 this may be readily done by simply hooking the hook 14 of the bridle ring 11 within the opening 16, and then compressing the bridle ring by simple manipulation so that the hook 13 can be made to spring within the hole 12 and engage the under surface of the struck up boss 5.

Should it ever be desirable to remove the runs of bridle wires 17, 17 and the bridle ring 11, this can be easily done by compressing the bridle ring so as to free the hook 13 from the opening 12, which will then permit the hook 14 to be lifted out of the opening 16.

It will be noted that there is no tapping or screwthreading of my clamp nor is it necessary to place screw threads upon the bridle ring. This permits me to use comparatively thin sheet metal, the boss and strengthening shoulder serving to strengthen the clamp at its weakest point.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with a boss raised above the surface of the base, the boss having an opening for the reception of a securing screw, the boss and base being provided with means to coöperate with and hold both ends of a bridle ring.

2. A conduit or cable clamp formed from sheet metal having a hook portion and a base, the base being provided with a struck up boss raised above the surface of the base and provided with an opening for the reception of a securing screw, a flange on the base said flange and boss being provided with means to coöperate with a bridle ring.

3. A conduit or cable clamp formed from sheet metal having a hook portion and a base, the base being provided with a struck up portion forming an integral boss and strengthening shoulder, the shoulder extending from the boss to the hook portion and serving to transmit some of the load directly to the securing screw, and means on the boss and base to coöperate with both ends of a bridle ring.

4. A conduit or cable clamp provided with a hook portion and a base, the base being provided with a boss raised above the surface of the base, the boss having an opening for the reception of a securing screw, the boss and base being provided with means to coöperate with and hold a bridle ring, and a bridle ring having its two ends coöperating respectively with the boss and base.

JOHN KARITZKY.

Witnesses:
F. W. KARITZKY,
EMIL BETZ.